United States Patent
Shimada

(10) Patent No.: US 7,973,819 B2
(45) Date of Patent: Jul. 5, 2011

(54) METHOD AND APPARATUS FOR DETERMINING THE POSITION OF A MOVING OBJECT, BY USING VISIBLE LIGHT COMMUNICATION

(75) Inventor: Shigehito Shimada, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 384 days.

(21) Appl. No.: 12/174,815

(22) Filed: Jul. 17, 2008

(65) Prior Publication Data

US 2009/0033757 A1    Feb. 5, 2009

(30) Foreign Application Priority Data

Jul. 31, 2007 (JP) ................................. 2007-199543

(51) Int. Cl.
*H04N 5/228* (2006.01)
*H04N 9/47* (2006.01)
*H04N 7/18* (2006.01)
*H04N 7/00* (2006.01)

(52) U.S. Cl. .................... 348/208.14; 348/94; 348/148; 348/140; 348/113

(58) Field of Classification Search ............ 348/208.14, 348/94–95, 148–149, 113–120, 135–142; 340/988–996; 359/155
See application file for complete search history.

(56) References Cited

U.S. PATENT DOCUMENTS

| | | | | |
|---|---|---|---|---|
| 5,732,385 | A * | 3/1998 | Nakayama et al. | 701/201 |
| 6,286,607 | B1 * | 9/2001 | Ohtomo et al. | 172/4.5 |
| 7,392,155 | B2 * | 6/2008 | Fujii et al. | 702/158 |
| 7,706,917 | B1 * | 4/2010 | Chiappetta et al. | 700/245 |
| 7,728,869 | B2 * | 6/2010 | Jung | 348/113 |
| 2002/0089722 | A1 * | 7/2002 | Perkins et al. | 359/155 |
| 2002/0145555 | A1 * | 10/2002 | Klausing et al. | 342/25 |
| 2002/0198643 | A1 * | 12/2002 | Lee | 701/41 |
| 2004/0121820 | A1 * | 6/2004 | Unno et al. | 455/569.2 |
| 2005/0212702 | A1 * | 9/2005 | Brabec et al. | 342/357.09 |
| 2006/0139619 | A1 * | 6/2006 | Fujii et al. | 356/4.03 |
| 2007/0059098 | A1 * | 3/2007 | Mayfield et al. | 404/84.5 |
| 2007/0088497 | A1 * | 4/2007 | Jung | 701/207 |

FOREIGN PATENT DOCUMENTS

DE    10 2005 061 786    6/2007
(Continued)

OTHER PUBLICATIONS

Official Action dated Jul. 28, 2009, issued in counterpart Russian application No. 2008131545, with English translation (7 pages).
Grantham K.H. Pang et al., "LED Location Beacon System Based on Processing of Digital Images", IEEE Transactions on Intelligent Transportation Systems, vol. 2, No. 3, Sep. 1, 2001, pp. 135-150.

(Continued)

*Primary Examiner* — Sinh Tran
*Assistant Examiner* — Christopher K Peterson
(74) *Attorney, Agent, or Firm* — Finnegan, Henderson, Farabow, Garrett & Dunner, L.L.P.

(57) ABSTRACT

An apparatus for determining the present position of a vehicle, by utilizing a visible-light communication system. The apparatus uses a visible-light communication beacon and video data representing an image photographed by one camera. The beacon emits a visible optical signal, thus transmitting position data. The visible-light communication beacon comprises a road-illuminating lamp and a visible-light communication apparatus, both secured to a lamp post. The vehicle has the camera and a vehicle position determination apparatus. The vehicle position determination apparatus demodulates the visible optical signal, there restoring the position data, and calculates the present position of the vehicle from the position data.

6 Claims, 6 Drawing Sheets

| FOREIGN PATENT DOCUMENTS | | |
|---|---|---|
| JP | 10 82648 | 3/1998 |
| JP | 2002-202741 | 7/2002 |
| JP | 2004-193898 | 7/2004 |
| JP | 2007-81703 | 3/2007 |

OTHER PUBLICATIONS

European Search Report dated Jul. 13, 2009, issued in counterpart European application No. 08158636.4-2220 / 2026086 (7 pages).

* cited by examiner

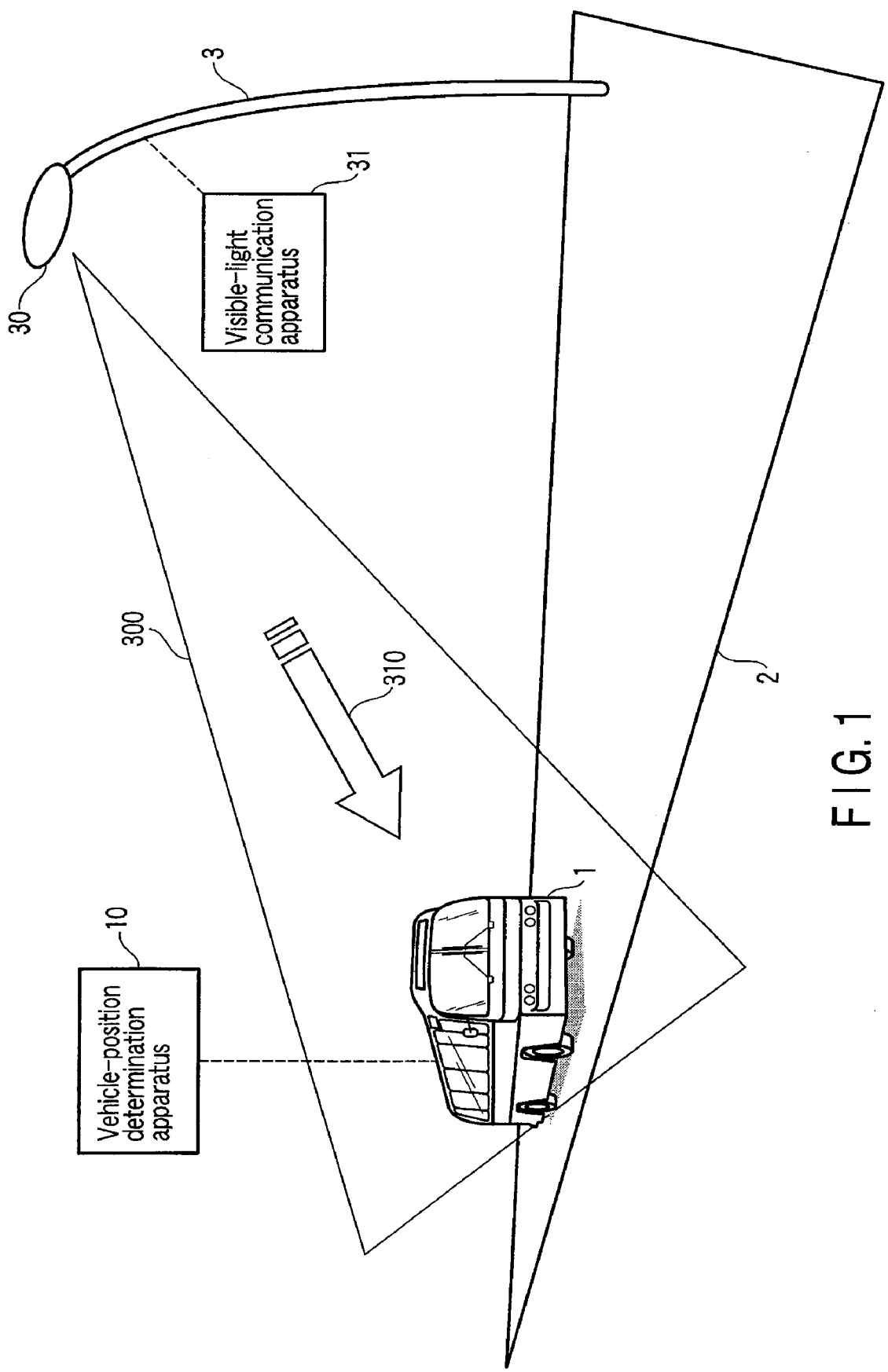
F I G. 1

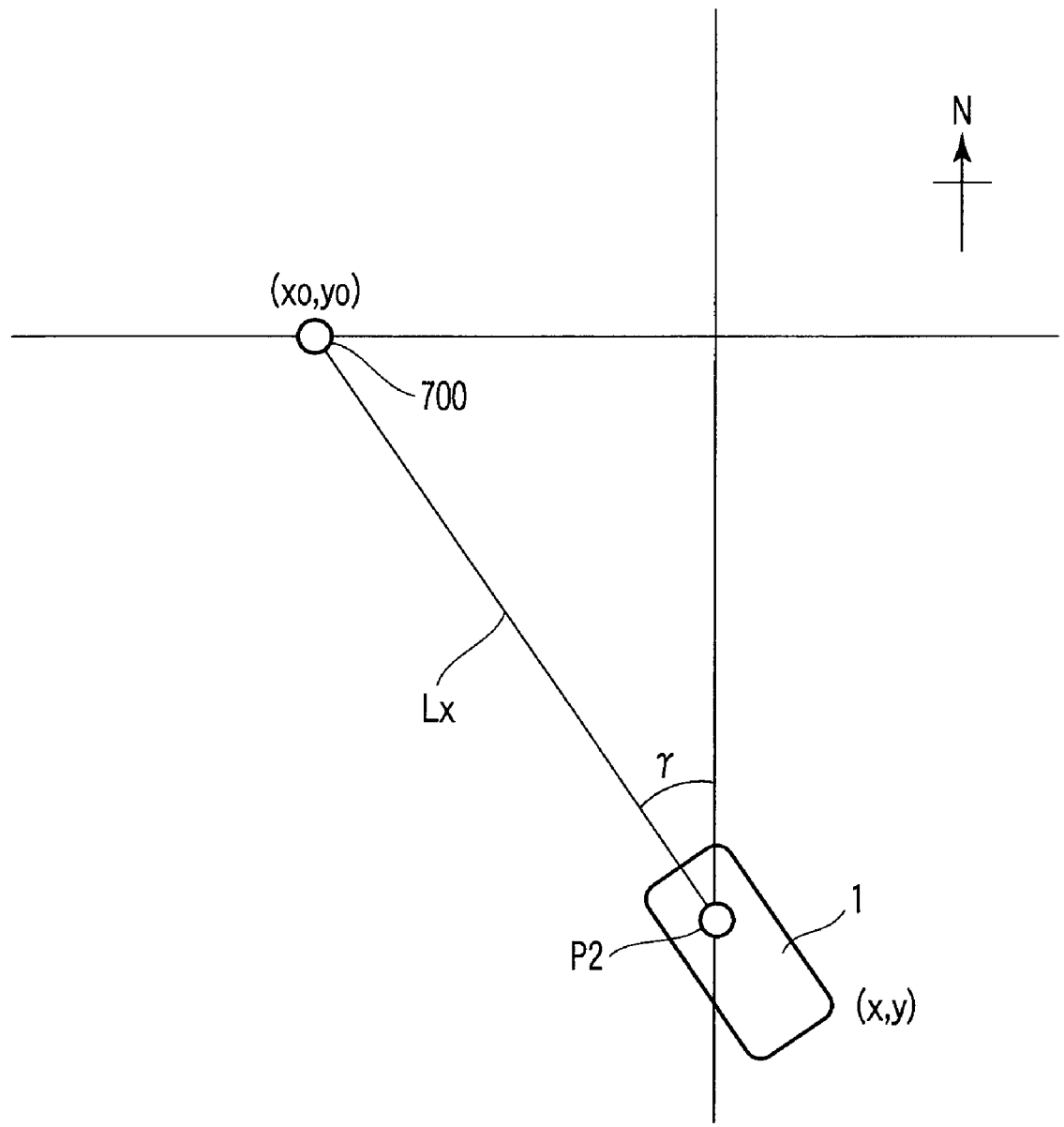
F I G. 6

METHOD AND APPARATUS FOR DETERMINING THE POSITION OF A MOVING OBJECT, BY USING VISIBLE LIGHT COMMUNICATION

CROSS-REFERENCE TO RELATED APPLICATIONS

This application is based upon and claims the benefit of priority from prior Japanese Patent Application No. 2007-199543, filed Jul. 31, 2007, the entire contents of which are incorporated herein by reference.

BACKGROUND OF THE INVENTION

1. Field of the Invention

The present invention generally relates to a position determination system that utilizes visible light communication. More particularly, the invention relates to a position determination system that determines the position of a moving object such as a vehicle.

2. Description of the Related Art

In recent years, position determination systems utilizing the global positioning system (GPS) have been widely used as system for determining the present position of a vehicle, a representative example of which is an automobile. Each position determination system of this type is incorporated in, for example, a car-navigation apparatus.

Recently, position determination systems that utilize a visible-light communication system have been proposed as high-precision position determination systems. The visible-light communication system uses visible optical signals and can transmit visible optical signals modulated with position data that is necessary for the position determination function. (See, for example, Jpn. Pat. Appln. KOKAI Publication No. 2007-81703.)

Visible optical signals used in such a position determination system may be used in combination with stereoscopic video data generated by a plurality of video cameras mounted on a vehicle. This makes it possible to determine the present position of, for example, an automobile running on a road.

Any system that uses a plurality of cameras mounted on each vehicle, however, is expensive due to not only the use of cameras, but also the use of an apparatus that performs complex signal processing, such as the processing of stereoscopic video signals. In view of this, the position determination system of this type can hardly be put to practical use.

BRIEF SUMMARY OF THE INVENTION

An object of the present invention is to provide a position determination system that utilizes a visible-light communication system and can yet easily be put to practical use.

According to one aspect of this invention, there is provided a position determination system that uses a visible-light communication beacon and a single-lens photographing means. The beacon emits position data in the form of visible optical signals. The single-lens photographing means has a camera and generates video data representing an image photographed by the camera.

The position determination system according to this aspect of the invention comprises: a transmitting unit which is located at a fixed position and transmits a visible optical signal modulated with position data including height data; a single-lens photographing unit which is provided on the moving object and photographs the transmitting unit; data-acquiring unit which is provided on the moving object and receives the visible optical signal and acquires the position data from the visible optical signal; and a determining unit which is provided on the moving object and uses video data generated by the single-lens photographing unit, thereby determining the position of the moving object.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing the major components of a position determination system according to an embodiment of this invention;

FIG. 6 is a diagram explaining how the system according to the embodiment corrects position data in order to determine the position of a vehicle.

DETAILED DESCRIPTION OF THE INVENTION

Figure 2:
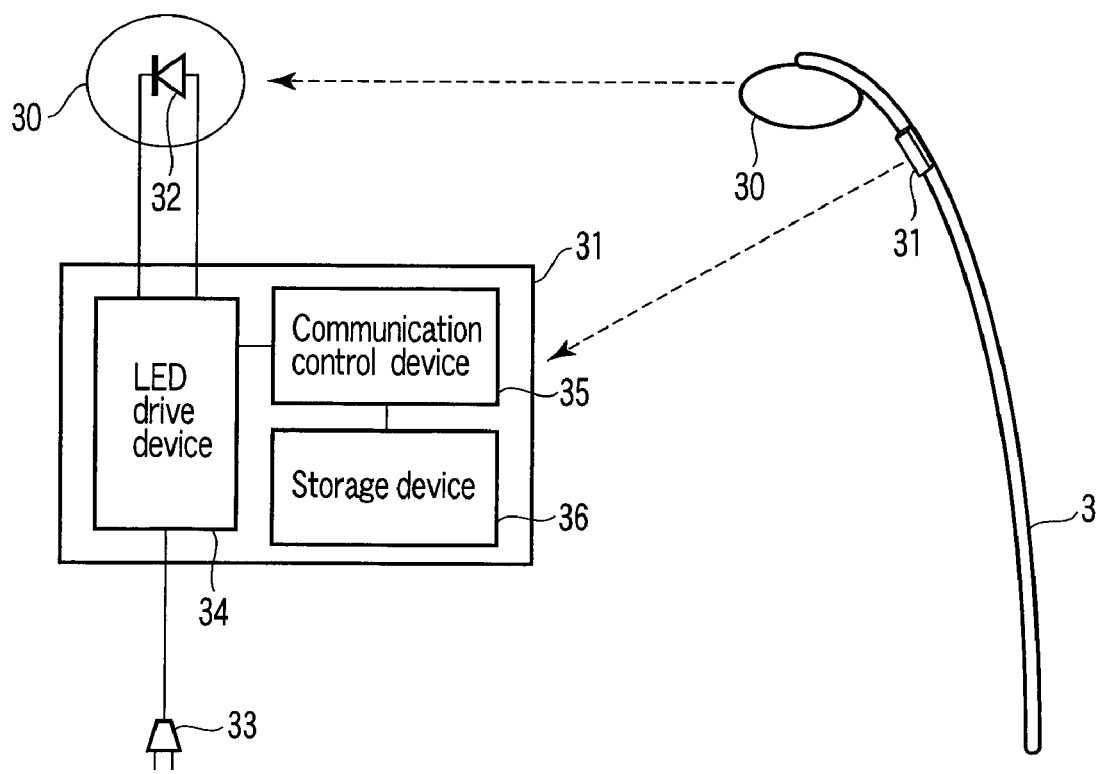
FIG. 2 is a diagram depicting the configuration of a visible-light communication apparatus according to the embodiment.

An embodiment of the present invention will be described with reference to the accompanying drawings.

(Configuration of the System)

FIG. 1 is a diagram showing the major components of a position determination system according to an embodiment of the invention.

The embodiment is a system that determines the present position of an automobile (hereinafter referred to as vehicle) 1, by utilizing a visible-light communication system. The major components of the system are: a lamp post 3 and a position determination apparatus 10. The lamp post 3 stands on one side of a road 2 on which the vehicle 1 is running. The position determination apparatus 10 (hereinafter called vehicle position determination apparatus) is mounted on the vehicle 1.

The lamp post 3 has a road-illumination lamp 30 and a visible-light communication apparatus 31. The lamp 30 illuminates the road 2. The lamp 30 has a light-emitting diode (hereinafter referred to as LED) and emits illumination light 300. Thus, the lamp 30 as a visible-light communication beacon, which will be described later.

The visible-light communication apparatus 31 drives and controls the LED included in the road-illumination lamp 30, and constitute the visible-light communication beacon. The beacon emits a visible optical signal 310 that contains position data. Hereinafter, the facility composed of the lamp post 3 fixed in position, road-illumination lamp 30 and visible-light communication apparatus 31 will be called "visible-light communication beacon".

The vehicle position determination apparatus 10 receives a visible optical signal transmitted from the visible-light communication beacon. The visible optical signal is demodulated, providing position data. From the position data, the vehicle position determination apparatus 10 determines the present position of the vehicle 1. Note that the position data includes coordinate data (longitude and latitude) and height data. The coordinate data represents the position of the visible-light communication beacon that is fixed in position. The height data represents the distance from the road 2 to the road-illumination lamp 30. (In other words, the height data represents the height "H" of the visible-light communication beacon.)

(Configuration of the Visible-Light Communication Apparatus)

FIG. 2 is a diagram depicting the configuration of a visible-light communication apparatus 31 according to the embodiment.

As FIG. 2 shows, the visible-light communication apparatus 31 is fixed in position to the lamp post 3, and located near the road-illumination lamp 30. The apparatus 31 has a power supply 33, an LED drive device 34, a communication control device 35, and a storage device 36. The LED drive device 34 drives the LED 32 that is a light-emitting element of the road-illumination lamp 30. The communication control device 35 controls the LED drive device 34, ultimately turning on and off the LED 32 repeatedly. Thus driven, the LED 32 transmits a visible optical signal 310 modulated with the position data stored in the storage device 36. The position data contains the above-mentioned height data and the coordinate data representing the position of the visible-light communication beacon at a fixed position.

The position data about the visible-light communication beacon has been stored into the storage device 36 beforehand or has been transmitted by radio and then stored into the storage device 36. The visible-light communication apparatus 31 modulates the visible light emitted by the LED 32 with the position data, generating a visible optical signal (a visible-light beacon signal) 310. The visible light may be modulated an appropriate method selected from the various methods available, such as on-off control and RGB modulation.

(Configuration of the Position Determination Apparatus)

Figure 3:
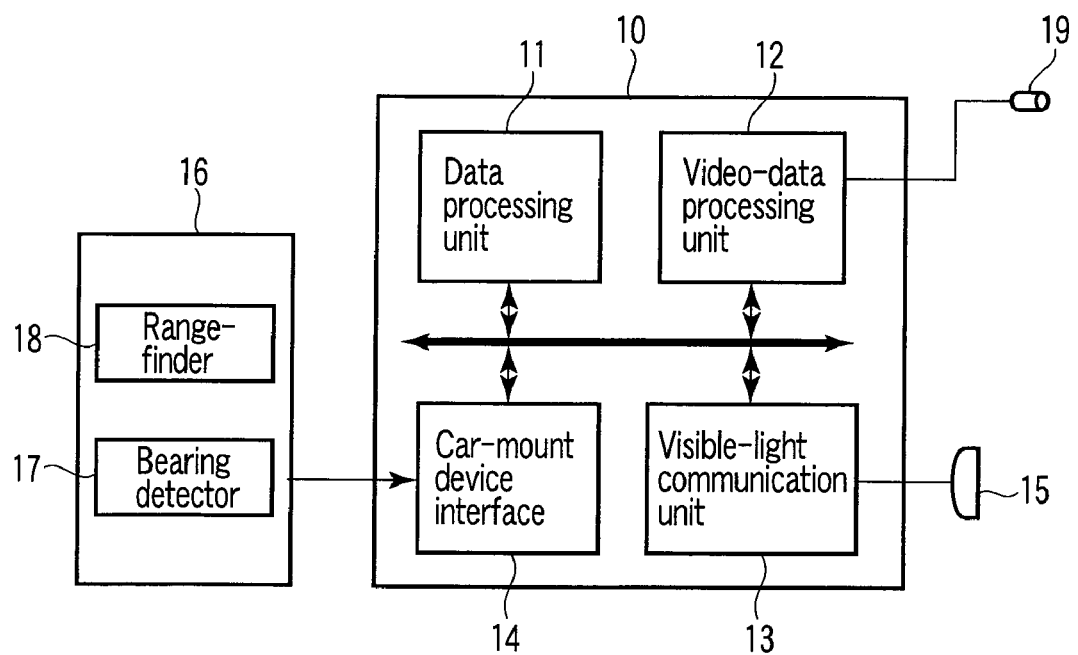
FIG. 3 is a diagram depicting the configuration of a vehicle position determination apparatus according to the embodiment.

FIG. 3 is a diagram depicting the configuration of a vehicle position determination apparatus 10 according to the embodiment.

The vehicle 1 has not only the vehicle position determination apparatus 10, but also a car-mount measuring device 16 and a car-mount video camera 19 (hereinafter called camera). As FIG. 3 shows, the car-mount measuring device 16 includes a light-receiving unit 15, a bearing detector 17, and a range finder 18. The light-receiving unit 15 receives visible light.

The light-receiving unit 15 is a photodiode (PD) element, and receives the visible optical signal and converts it to an electric signal which is supplied to the vehicle position determination apparatus 10. The bearing detector 17 and the range finder 18 are connected to the vehicle position determination apparatus 10. The bearing detector 17 detects the bearing of the vehicle 1 and generates a bearing signal, and the range finder 18 determines the distance the vehicle 1 has traveled and generates a distance signal. The bearing signal and the distance signal are output to the vehicle position determination apparatus 10. The camera 19 is a single-lens photographing device and generates video data representing any image it has photographed. The video data is output to the vehicle position determination apparatus 10.

The vehicle position determination apparatus 10 comprises a data processing unit 11, a video data processing unit 12, a visible-light communication unit 13, and a car-mount device interface 14. The data processing unit 11 performs operations in order to determine the position of the vehicle 1 as will be described later. The video data processing unit 12 processes the video data supplied from the camera 19, generating video data. This video data is transferred to the data processing unit 11 and will be used to calculate the height of the visible-light communication beacon. The data processing unit 11 and the video data processing unit 12 are constituted by a microprocessor or software.

The visible-light communication unit 13 demodulates the visible optical signal (electric signal) received by the light-receiving unit 15, thus restoring the position data. The position data thus restored is transferred to the data processing unit 11. Meanwhile, the car-mount device interface 14 receives the bearing signal and the distance signal from the bearing detector 17 and the range finder 18, respectively, and transfers these signals to the data processing unit 11.

(Operation of the Position Determination System)

How the position determination system according to this embodiment operates will be explained, with reference to FIGS. 4 to 7.

Figure 4:
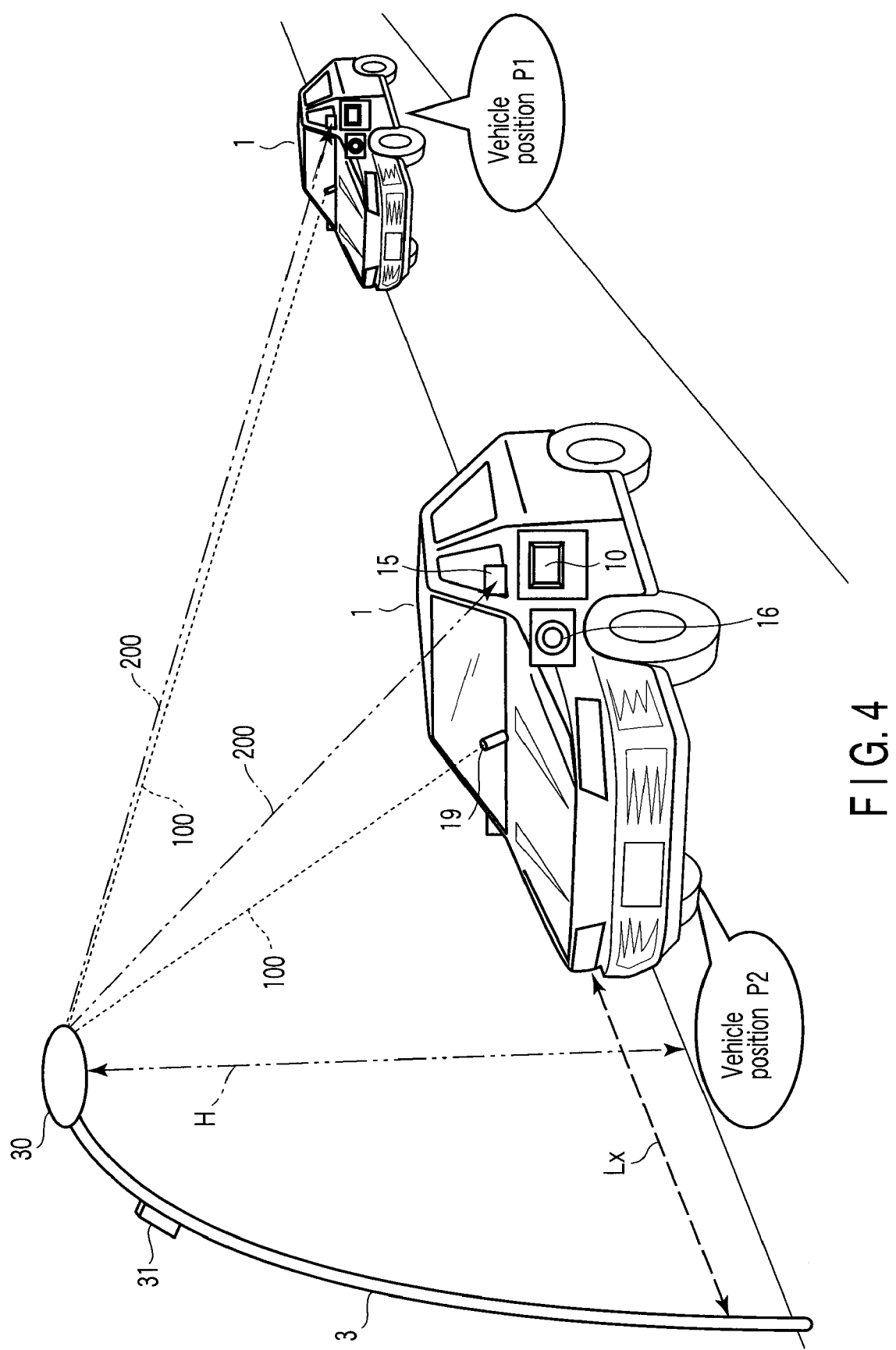
FIG. 4 is a diagram explaining the position determination operation performed by the system according to the embodiment, and showing the positional relation a running vehicle has with visible-light communication beacons.
Figure 7:
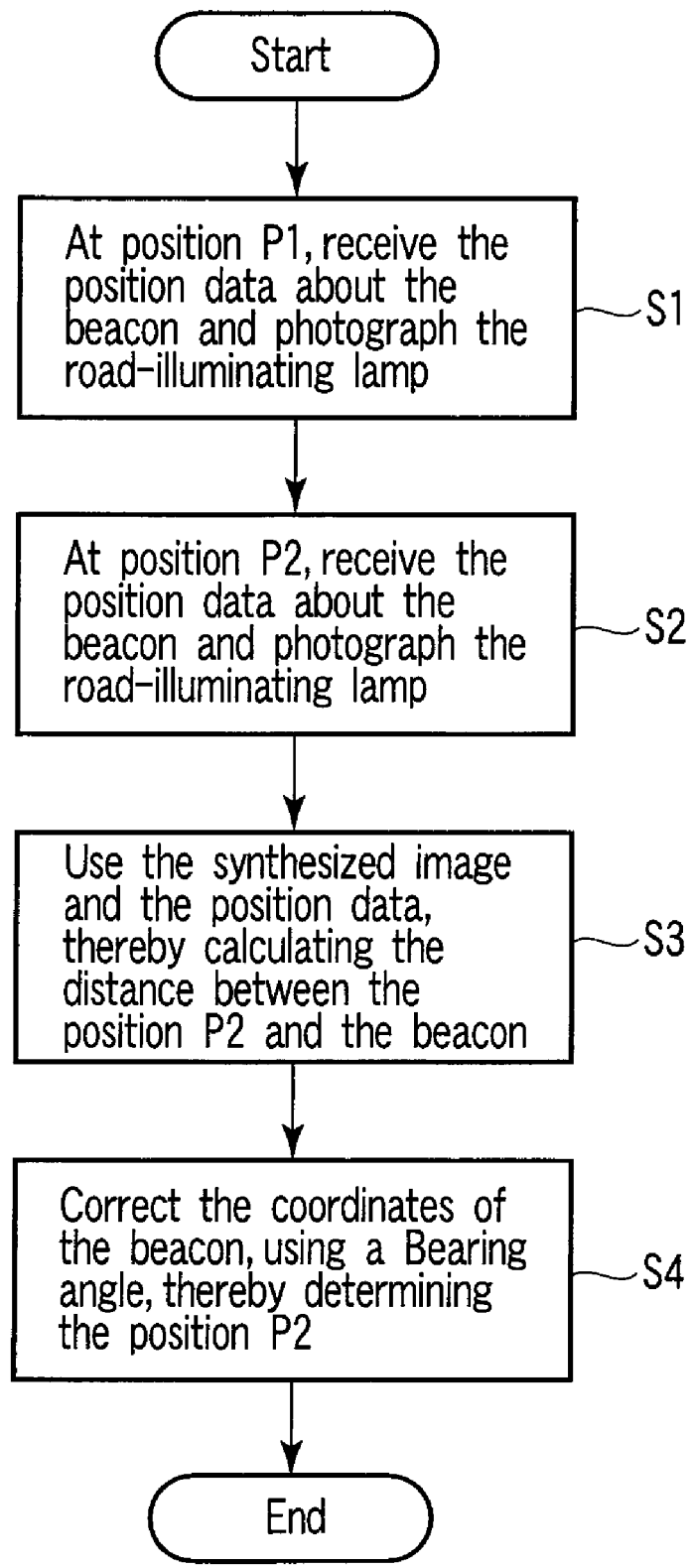
FIG. 7 is a flowchart explaining a sequence of steps the system according to the embodiment performs.

First, the operation of the system will be outlined with reference to FIG. 4 and the flowchart of FIG. 7.

The position determination system according to this embodiment is designed to determine position P2 (second position) the vehicle 1 assumes at present, after travelling on the road from position P1 (first position).

The road is illuminated with the light emitted from the LED 32 of the road-illumination lamp 30. The road-illumination lamp 30 transmits visible optical signals 200 in various directions to the road. The signals 200 are visible-light communication beacons, each fixed in a specific position and containing position data.

The moment the vehicle 1 is at the first position P1, the light-receiving unit 15 receives a visible optical signal 200 emitted by the visible-light communication beacon (Step S1). In the vehicle position determination apparatus 10, the visible-light communication unit 13 receives the visible optical signal 200 from the light-receiving unit 15 and demodulates the signal 200 (electric signal), restoring the position data. The position data is transferred to the data processing unit 11.

In the vehicle 1 at the position P1, the camera 19 photographs the road-illumination lamp 30 and the lamp post 3 holding the lamp 30 at the time the light-receiving unit 15 receives the visible optical signal 200 (Step S1). In the vehicle position determination apparatus 10, the video data processing unit 12 receives the image 100 photographed by the camera 19. The unit 12 processes the image 100, generating video data. The video data is transferred to the data processing unit 11 so that the height (H) of the visible-light communication beacon may be calculated.

When the vehicle 1 travels from the position P1 to the position P2, the light-receiving unit 15 receives a visible optical signal 200 coming from the visible-light communication beacon. At the same time, the camera 19 photographs the visible-light communication beacon (Step S2). That is, in the vehicle position determination apparatus 10, the visible-light communication unit 13 demodulates the visible optical signal 200, restoring the position data. The position data thus restored is transferred to the data processing unit 11.

The data processing unit 11 has an internal memory, which holds the position data items restored the moment the vehicle 1 is at the positions P1 and P2, respectively. The video data processing unit 12 receives the image 100 photographed by the camera 19, generating video data. The video data is transferred to the data processing unit 11.

In the vehicle position determination apparatus 10, the rangefinder 18 determines the distance Lo the vehicle 1 has traveled from the position P1 to the position P2 and generates a distance signal. The distance signal is transferred to the data processing unit 11 of the vehicle position determination apparatus 10. In the data processing unit 11, the data representing the distance Lo is stored in the internal memory.

In the vehicle position determination apparatus 10, the data processing unit 11 synthesizes two video data items the video data processing unit 12 has acquired at the positions P1 and P2, respectively, generating synthesized video data. Using the synthesized video data, the position data and the data representing the distance Lo (distance the vehicle 1 has traveled), the data processing unit 11 determines the distance Lx between the position (P2) of the vehicle 1 and the visible-light communication beacon and also the coordinates of the position P2 (Step S3).

In the vehicle position determination apparatus 10, the data processing unit 11 further receives data representing the bearing angle detected by the bearing detector 17 at the position P2, from the car-mount measuring device 16 through the car-mount device interface 14. Based on the bearing angle, the data processing unit 11 corrects the coordinates of the position P2, thereby calculating the present position of the vehicle 1 (Step S4).

Figure 5:
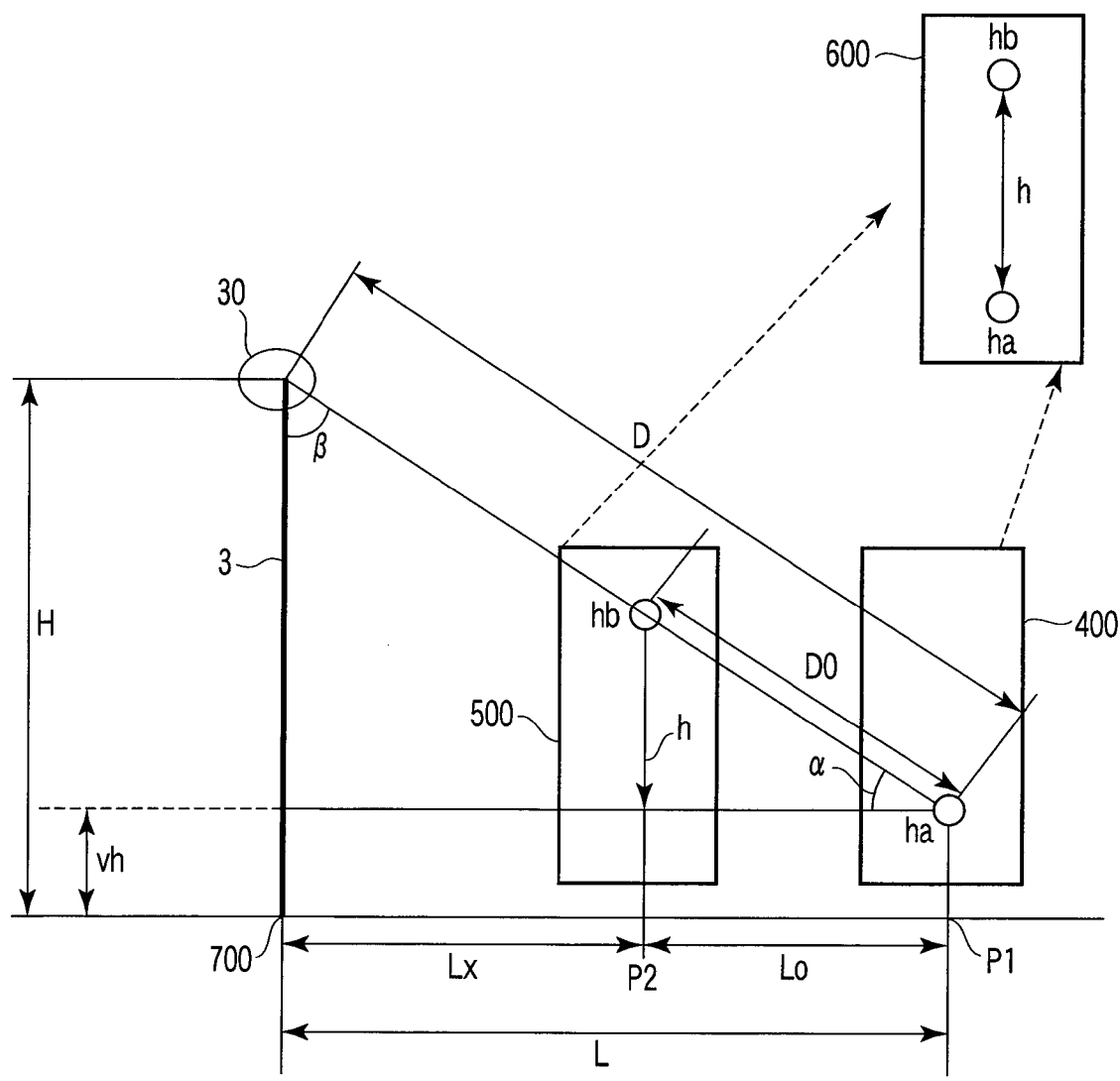
FIG. 5 is a diagram explaining a sequence of arithmetic operations that the system according the embodiment performs to determine the position of a vehicle.

A sequence of calculation the vehicle position determination apparatus 10 according to this embodiment performs to determine the position of the vehicle 1 will be explained in detail, with reference to FIGS. 5 and 6.

First, how the apparatus 10 calculates the distance Lx between the position P2 and the visible-light communication beacon will be explained, on the assumption that the vehicle 1 has travelled from the position P1 on the road to the position P2. Here, the position 700 of the visible-light communication beacon is defined, for the sake of convenience, as distance between the road-illumination lamp 30 and the intersection of the road surface and a perpendicular extending from the lamp 30.

In the vehicle position determination apparatus 10, the data processing unit 11 calculates the height h of the lamp post 3, as measured in a synthesized image 600 obtained by synthesizing two video data items 400 and 500 garnered at the positions P1 and P2 by the video data processing unit 12. As seen from FIG. 5, the height h is the difference between the height ha that the camera 19 has at the position P1 and a point hb at which the position P2 intersects with a line along which the road-illumination lamp 30 is photographed at angle α.

The following relations (1) to (5) hold in the present embodiment:

$$DO=\sqrt{(Lo)^2+h^2} \quad (1)$$

$$\alpha=\cos^{-1}(Lo/DO) \quad (2)$$

$$\beta=90-\alpha \quad (3)$$

$$L=(H-vh)\tan\beta \quad (4)$$

$$Lx=L-Lo \quad (5)$$

where H is the height of the visible-light communication beacon 700, vh is the height of the camera 19 mounted on the vehicle 1, and L is the distance between the position P1 and the position 700 of the visible-light communication beacon.

The data processing unit 11 calculates the distance Lo between the positions P1 and P2 from the travel distance of the vehicle 1, determined by the rangefinder 18. The data processing unit 11 finds the height H of the visible-light communication beacon, from the position data acquired by demodulating the visible optical signal 200 the light-receiving unit 15 has received.

The data processing unit 11 of the vehicle position determination apparatus 10 performs calculations based on the relations (1) to (5) specified above, finding the distance Lx between the vehicle 1 traveled to the position P2 and the position 700 of the visible-light communication beacon.

A sequence of calculating the coordinates (x, y) of the position P2 to which the vehicle 1 has traveled will be explained with reference to FIG. 6.

The position of the visible-light communication beacon is defined by coordinates (xo, yo). The coordinates are position data that generally represents the longitude and the latitude. In the vehicle position determination apparatus 10, the light-receiving unit 15 receives visible optical signal 200, and the visible-light communication unit 13 demodulates the signal 200, extracting the coordinates (xo, yo). The position data representing the coordinates (xo, yo) is transferred to the data processing unit 11. Meanwhile, the data processing unit 11 obtains the bearing angle γ from the bearing detector 17 of the car-mount measuring device 16 through the car-mount device interface 14.

The data processing unit 11 corrects the coordinates (xo, yo) of the visible-light communication beacon by using the relations (6) and (7) given below, calculating the coordinates (x, y) of the position P2 where the vehicle 1 momentarily stays. More precisely, the data processing unit 11 correcting the coordinates (xo, yo) of the beacon calculates the coordinates (x, y) by using the distance Lx between the vehicle 1 and the position of the beacon, calculating the coordinates (x, y) of the position P2, i.e., the present position of the vehicle 1.

$$x=xo-Lx\cdot\sin\gamma \quad (6)$$

$$y=yo-Lx\cdot\cos\gamma \quad (7)$$

In the system according to this embodiment, the data processing unit 11 can find the coordinates (x, y) of the vehicle 1 from the coordinates (xo, yo) of the visible-light communication beacon, the distance Lx between the vehicle 1 and the position of the beacon, and the bearing angle γ of the vehicle 1. Note that the distance Lx between the vehicle 1 and the visible-light communication beacon can be obtained by means of so-called trigonometrical survey, using a synthesized image prepared by synthesizing images photographed by one camera 19.

That is, the distance Lx between the vehicle 1 and the beacon can be calculated in the system according to the embodiment, merely using a single-lens camera 19, without using a plurality of cameras or a complex video data process such as stereoscopic-image processing. Hence, the distance Lx can be calculated at lower cost than in the case where a plurality of cameras is used. Moreover, the system according to the embodiment can easily be put to practical use, because most automobiles recently manufactured and sold have one camera each. In addition, the system according to the embodiment can find the coordinates of the vehicle 1 with high accuracy, because the coordinates (xo, yo) of the beacon is corrected.

Thus, the embodiment can provide a position determination system that utilizes a visible-light communication system and can yet be easily to use at low cost.

In the embodiment described above, the visible-light communication beacon is constituted by the road-illumination lamp 30 located at a fixed position. Nonetheless, the visible-light communication beacon may be constituted by, for example, an illumination lamp of such a type that finds use in buildings or facilities. Further, the visible-light communication beacon need not be integrated with the illumination lamp. It may an independent device that transmits visible optical signals.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for determining the position of a moving object, comprising:
   a transmitting unit which is located at a fixed position and transmits a visible optical signal modulated with position data including height data;
   a single-lens photographing unit which is provided on the moving object and photographs the transmitting unit;
   a data-acquiring unit which is provided on the moving object and receives the visible optical signal and acquires the position data from the visible optical signal; and
   a determining unit which is provided on the moving object and uses video data generated by the single-lens photographing unit, thereby determining the position of the moving object,
   wherein the determining unit comprises:
      a height-calculating unit which uses synthesized video data prepared by synthesizing first video data representing an image photographed by the single-lens photographing unit when the moving object is at a first position and second video data representing an image photographed by the single-lens photographing unit when the moving object reaches a second position from the first position, thereby calculating a height difference that the fixed position has in a synthesized image represented by the synthesized video data;
      a distance-calculating unit which uses the height difference, the data included in the position data and the distance between the first and second positions, thereby calculating a distance between a present position of the moving object and the fixed position; and
      a correcting/calculating unit which uses the distance calculated by the distance-calculating unit, a bearing detected by a bearing detector provided on the moving object and coordinates of the fixed position, thereby calculating the present position of the moving object.

2. The system according to claim 1, wherein the transmitting unit is provided in a road-illuminating lamp for illuminating a road on which the moving object such as a vehicle moves and includes:
   a storage unit which stores the position data included in the visible optical signal; and
   a light-emitting element drive unit which controls and drives a light-emitting element provided in the road-illuminating lamp, causing the light-emitting element to transmit the visible optical signal modulated with the position data stored in the storage unit.

3. The system according to claim 1, wherein the transmitting unit is provided in a facility such as a building and secured to a structure which is able to transmit the visible optical signal.

4. An apparatus to be mounted on a moving object and designed to determine the position of the moving object, the apparatus comprising:
   a receiving unit which receives a visible optical signal transmitted from a transmitting unit at a fixed position, the visible optical signal being modulated with position data including height data;
   a demodulating unit which demodulates the visible optical signal, thereby restoring the position data;
   a single-lens photographing unit which photographs an object located at the fixed position and outputs video data representing an image of the object; and
   a determining unit which uses the video data output by the single-lens photographing unit, thereby determining the position of the moving object,
   wherein the determining unit comprises:
      a height-calculating unit which uses synthesized video data prepared by synthesizing first video data representing an image photographed by the single-lens photographing unit when the moving object is at a first position and second video data representing an image photographed by the single-lens photographing unit when the moving object reaches a second position from the first position, thereby calculating a height difference that the fixed position has in a synthesized image represented by the synthesized video data;
      a distance-calculating unit which uses the height difference, the data included in the position data and the distance between the first and second positions, thereby calculating a distance between a present position of the moving object and the fixed position; and
      a correcting/calculating unit which uses the distance calculated by the distance-calculating unit, a bearing detected by a bearing detector provided on the moving object and coordinates of the fixed position, thereby calculating the present position of the moving object.

5. The apparatus according to claim 4, wherein the moving object is a vehicle, and the receiving unit includes:
   a light-receiving element which receives the visible optical signal transmitted from the transmitting unit provided on a road-illuminating lamp for illuminating a road.

6. A method of determining the present position of a moving object by utilizing a visible optical signal which is transmitted from a transmitting unit located at a fixed position and which is modulated with position data including height data, the method comprising:
   photographing the transmitting unit by using a single-lens photographing unit provided on the moving object, thereby generating video data;
   receiving the visible optical signal at the moving object, thereby acquiring the position data from the visible optical signal; and
   using video data and the position data at the moving object, thereby determining the position of the moving object,
   wherein the determining comprises:
      using synthesized video data prepared by synthesizing first video data representing an image photographed by the single-lens photographing unit when the moving object is at a first position and second video data representing an image photographed by the single-lens photographing unit when the moving object reaches a second position from the first position, thereby calculating a height difference that the fixed position has in a synthesized image represented by the synthesized video data;
      using the height difference, the data included in the position data and the distance between the first and second positions, thereby calculating a distance between a present position of the moving object and the fixed position; and using the distance calculated by the distance-calculating unit, a bearing detected by a bearing detector provided on the moving object and coordinates of the fixed position, thereby calculating the present position of the moving object.

* * * * *